(12) United States Patent
Masuda

(10) Patent No.: US 6,212,187 B1
(45) Date of Patent: Apr. 3, 2001

(54) MULTIPROCESSOR ATM EXCHANGE

(75) Inventor: Shinji Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/025,780

(22) Filed: Feb. 19, 1998

(30) Foreign Application Priority Data

Feb. 19, 1997 (JP) .................................................. 9-034177

(51) Int. Cl.$^7$ .................................................. H04L 12/56
(52) U.S. Cl. .................................................. 370/395
(58) Field of Search .................................. 370/395, 389, 370/397, 399, 401, 400, 351, 352, 522, 524; 379/225, 219, 230, 231, 232, 234

(56) References Cited

U.S. PATENT DOCUMENTS 5,959,991 * 9/1999 Hatono et al. ......................... 370/395
5,974,033 * 10/1999 Kamiya et al. ....................... 370/395

FOREIGN PATENT DOCUMENTS 2-198295    8/1990    (JP) .

* cited by examiner

Primary Examiner—Dang Ton
(74) Attorney, Agent, or Firm—Sughrue, Mion, Zinn, Macpeak & Seas, PLLC

(57) ABSTRACT

The present invention provides a multiprocessor ATM exchange which permits an ATM exchange to be configured with multiple processors to provide high capacity. The CLP state management section of the common signaling processor collects load state information from the CLP load monitoring section of call control processors to manage the load state thereof, and manages the normal or abnormal state of the call control processors. The signal floating function section, when receiving an initial address message, selects a call control processor suitable for processing said call based on the contents of the CLP state management section. On receiving the initial address message, the B-ISUP body of a selected call control processor generates an origination signal identifier from an incoming internal call reference number and the clp number of the call control processor and appends the signal identifier to the signal to send it.

6 Claims, 8 Drawing Sheets

FIG.7
PRIOR ART
CONVERSION TABLE #n
CONVERSION TABLE #m
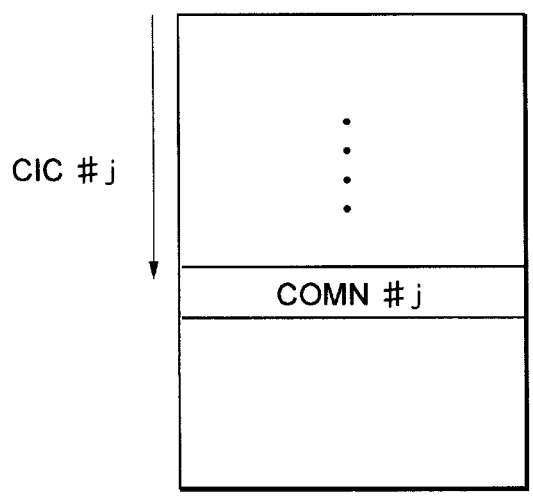
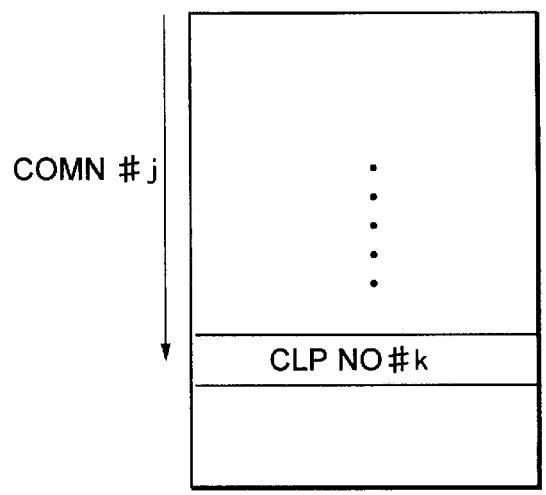
(a)
(b)

MULTIPROCESSOR ATM EXCHANGE

BACKGROUND OF THE INVENTION

This invention relates to a mutiprocessor ATM exchange and more particularly to a method for implementing SVC (switched virtual channel) by use of B-ISUP (broadband ISDN (integrated services digital network) user part).

Conventionally, to implement SVC in a multiprocessor exchange, when a plurality of call control processors is allocated to one node, a logic (call's floating) is required to determine which call control processor should be used to process signals for controlling calls.

The ISDN user part (ISUP) is used as a call control protocol in a toll switch of a narrow-band exchange system. In this case, a circuit (line) number is set in a call control signal and floating is implemented by associating the line number with a call control processor.

The above mentioned floating will now be explained with reference to FIG. 7. In this case, the number system of circuits in a local node is temporarily named comn and a circuit number common to an adjacent exchange is cic.

In conventional exchange nodes, cic understandable to both exchange nodes opposite each other is set in signals received by a common signaling processor to represent a circuit number.

Accordingly, a cic-to-comn conversion table and a comn-to-CLP (call control processor) number conversion table are prepared in advance in exchange nodes. When a call control signal is received, the CLP number of a call control processor is determined from cic by referencing these tables and floating can be implemented.

For example, as shown in FIG. 7, when a circuit number is cic#i, the number system of circuit is comn#j, the clp number "CLPno#k" of a call control processor is set to take correspondence with the number system comn#j of the channel line, cic#i is converted to comn#j by the cic-to-comn conversion table (see (a) in FIG. 7) and comn#j is converted to CLPno#k by the comn-to-clp number conversion table (see (b) in FIG. 7). Thus, CLPno#k is determined from cic#i.

In the above mentioned ISDN exchange node, as shown in FIG. 6, an initial address message (IAM) and an address complete message (ACM) are relayed. In FIG. 6, ISUP protocol processing is included in the incoming call control and the outgoing call control.

Namely, on receiving an IAM from a preceding exchange (an exchange relaying the initial address message), a common signaling processor (CSP) extracts the circuit number (cic) of the incoming circuit from the signal, references the above mentioned conversion tables to perform cic-to-comn conversion and comn-to-clp number conversion, and determines an incoming side clp number (e.g., #1) (step S21 in FIG. 6).

Accordingly, the common signaling processor performs floating the IAM to the input call control of the determined call control processor (CLP) of the clp number (#1). The call control processor of the clp number (#1) acquires the internal call reference number and starts call state management (step S22 in FIG. 6).

The call control processor of the clp number (#1) links the number system (comn) of circuit line with an internal call reference number (step S23 in FIG. 6) and determines a call transfer destination by analyzing the digits of the incoming number (step S24 in FIG. 6). Subsequently, the call control processor of clp number (#1) selects a route to the destination (step S25 in FIG. 6), selects the circuit number (cic) of outgoing circuit (step S26 in FIG. 6), references the above mentioned conversion tables to perform cic-to-comn conversion and comn-to-clp number conversion, determines an outgoing side clp number (e.g., #2), and holds the outgoing side clp number (step S27 in FIG. 6).

The call control processor of clp number (#1) transfers the incoming internal call reference number to the outgoing call control of a call control processor of clp number (#2). The call control processor of clp number (#2) acquires the internal call reference number, starts call state management, and holds the incoming call control clp number and internal call reference number (step S28 in FIG. 6). At this time, since the call control processor of clp number (#2) transfers an output internal call reference number to the incoming call control of the call control processor, the call control processor of clp number (#1) holds the outgoing internal call reference number (step S29 in FIG. 6).

Subsequently, the call control processor of clp number (#2) links the number system of channel line with the internal call reference number (step S30 in FIG. 6). In response to this, the common signaling processor (#2) sends an IAM to a succeeding exchange (an exchange to relay an IAM received by the local exchange to).

On receiving an address complete message from the succeeding exchange in response to the sent IAM, the common signaling processor (2#) extracts the circuit number (cic) of outgoing circuit from the address complete message, references the above mentioned conversion tables to perform cic-to-comn conversion and comn-to-clp number conversion, and determines an outgoing clp number (#2 in this case) (step S31 in FIG. 6).

According to the determination of the common signaling processor (#2), the call control processor of clp number (#2) extracts an internal call reference number from the number system (comn) of outgoing circuit and changes call state corresponding to the internal call reference number (step S32 in FIG. 6). Subsequently, the call control processor of clp number (#2) extracts the held incoming call control clp number (#1) and internal call reference number (step S33 in FIG. 6), and transfers the incoming internal call reference number to the incoming call control of the call control processor of the clp number (#1).

The call control processor of the clp number (#1) changes call state (step S34 in FIG. 6). On receiving notification of call state change in the incoming call control of the call control processor of the clp number (#1), the common signaling processor (#1) sends an address complete message to the preceding exchange, If B-ISUP is used to implement SVC with the above mentioned multiprocessor exchange, since single node selection of resources (speech channel) is made in B-ISUP, no speech channel may not be determined as a result of routing, so that speech channel information may not be set in an IAM.

Accordingly, when an ATM (asynchronous transfer mode) exchange using the call control signal protocol B-ISUP of broadband system is configured with above mentioned conventional multiple processors, the floating logic used in the call control signal protocol ISUP of narrow band system cannot be applied.

One side selection of resources will now be described. As shown in FIG. 8, for example, the following describes the case where adjacent nodes assigned point codes 20 (PC #20) and 10 (PC #10) respectively and resources VP #1, #2, #3, #4 and #5 exist between the nodes.

According to one side selection of resources, in the case described above, when a node (PC #20) having greater point code has the right to select resources (VP #2 and VP #4) of even numbers and a node (PC #10) having smaller point code has the right to select resources (VP #1, VP #3, and VP #5) of odd numbers, one node is informed which resources acquired by another node having selection right. In this case, resource acquisition is completely separated and collision will not occur between the nodes. In FIG. 8, the circle (○) denotes selection right.

SUMMARY OF THE INVENTION

An object of this invention is to solve the above mentioned problem and offer a multiprocessor ATM exchange which permits an ATM exchange to be configured with multiple processors to provide high capacity.

A multiprocessor ATM exchange of this invention, configured so that an initial address message received in a common signaling processor is processed by one of a plurality of call control processors allocated to an identical node, has notification means for notifying said common signaling processor of a load state of a local processor in each of a plurality of call control processors, wherein said common signaling processor has state management means for managing said load state and normal/abnormal state of each of said plurality of call control processors based on said notification means and transfer means for transferring said initial address message to one of said plurality of call control processors based on the management contents of said state management means when said initial address message is received.

This invention includes a floating logic whereby a common signaling processor (CSP) of B-ISUP (broadband ISDN user part), instead of static floating by use of a circuit number within a call control signal of ISUP (ISDN user part), performs dynamic floating based on the state monitoring of a call control processor (CLP) when an initial address message (IAM) is received, and a floating logic whereby floating of subsequent signals is performed using a signaling identifier (SID), a parameter required for B-ISUP, wherein call control processors have a logic of generating the signaling identifier.

In other words, the floating logic of the common signaling processor selects an optimum floating destination (call control processor) of an initial address message. The logic of generating a signaling identifier (SID) possessed by a call control processor embeds the call control processor number in the value of a signaling identifier between adjacent nodes.

By doing so, since the signaling identifier is handshaked between opposite exchanges regardless of by which common signaling processor are received following B-ISUP signals, floating to a call control processor can be performed by the common signaling processor, so that dynamic floating of B-ISUP signals is implemented.

A floating logic of determining a call control processor when a call is generated is to associate an initial address message with a call control processor when a plurality of call control processors are allocated to one node. In this case, a common signaling processor to receive a call control signal must select one from a plurality of call control processors to process the call if it is an initial address message.

This selection is based on the state of call control processors and the call control processor state management section of a common signaling processor holds said state. The state of call control processors is divided into normal state and abnormal state. In the case of normal state, the load state of call control processors is held in the state management section of common signaling processor.

The state of each call control processor changes dynamically with notification from the state monitoring section of call control processor, and if notification is broken for a given period of time, abnormal state occurs. A common signaling processor associates an initial address message with a call control processor which is in normal state and least loaded.

The logic of generating a signaling identifier, a parameter required for B-ISUP protocol signals, is a generation source of a signaling identifier and dictates how a signaling identifier is generated. In this case, to generate a signaling identifier unique in a node, the logic of generating a signaling identifier organizes a maximum of 32 bits of a signaling identifier by finding the logical OR of a call identifier having a unique value within each call control processor and the serial number of a call control processor having a unique value within the node so that both do not overlap within the 32 bits.

The floating logic of associating a B-ISUP protocol signal with a call control processor after determination of a call control processor dictates a method for associating a call control signal other than call occurrence with a call control processor. The floating logic, when a plurality of call control processors are allocated to one node, after an initial address message is associated with a call control processor, associates following call control signals with the call control processor.

A common signaling processor to receive a call control signal, if the signal is not an initial address message, extracts a call control processor number associated at reception of an initial address message to perform floating, from a signaling identifier generated within a local node and returned after being handshaked among adjacent nodes.

The above mentioned floating logic and signaling identifier generation logic permit implementation of a floating method corresponding to B-ISUP, permitting an ATM toll system to be configured with multiple processors to provide high capacity.

(a) in FIG. 7 is a diagram showing a cic-to-comn conversion table of a conventional example and (b) in FIG. 7 is a diagram showing a comn-to-clp number conversion table of a conventional example.

Figure 8:
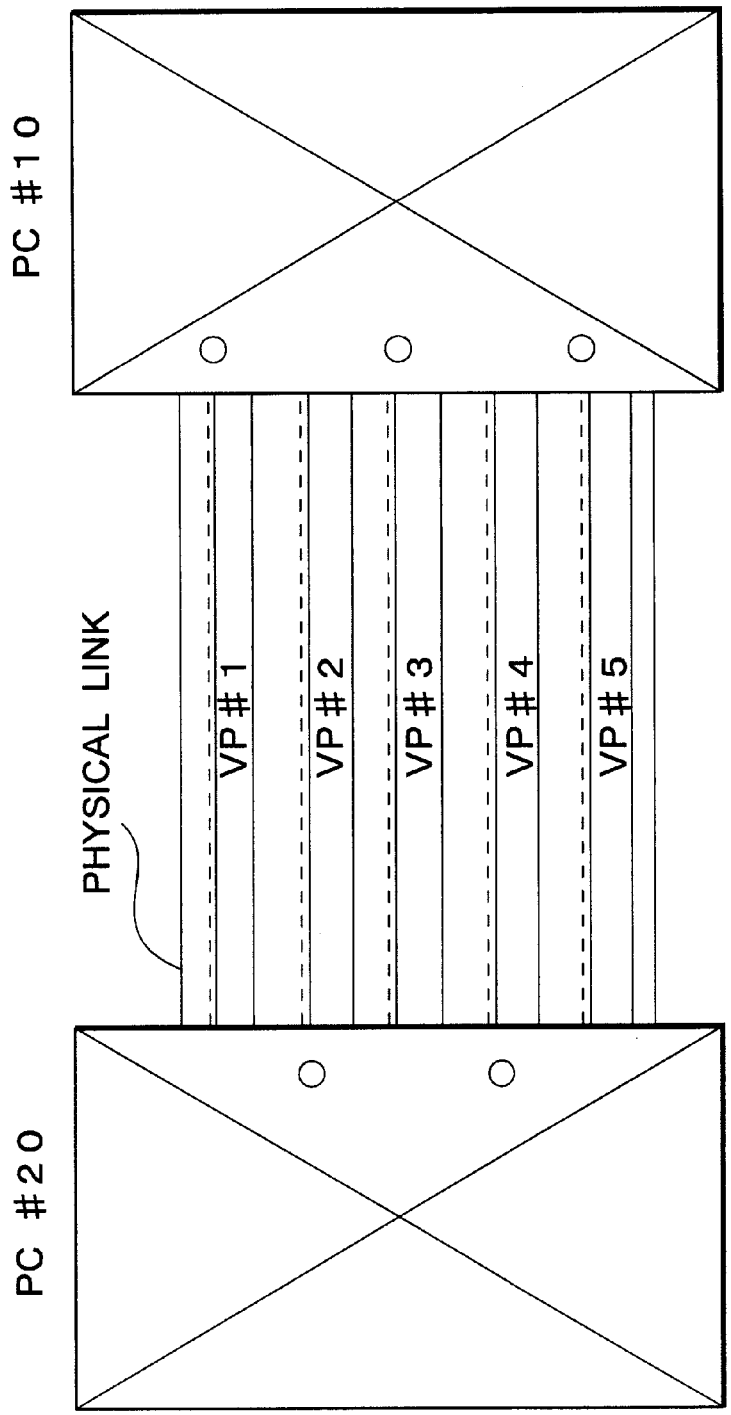

FIG. 8 is a diagram showing a single node selection of resources.

DESCRIPTION OF THE PREFERRED EMBODIMENTS

An embodiment of this invention will now be described with reference to the accompanied drawings.

Figure 1:
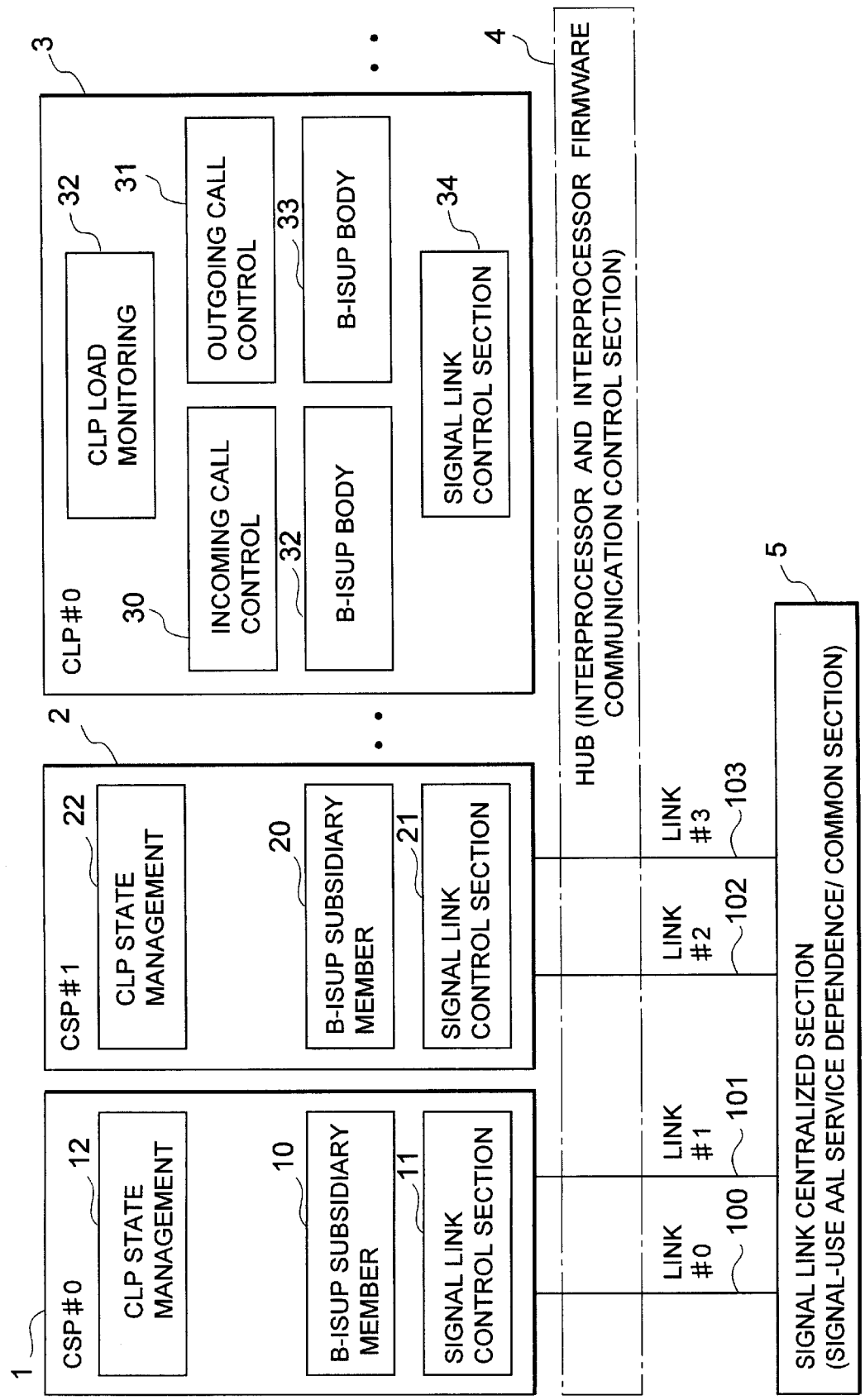
FIG. 1 is a block diagram showing the construction of the control system of a multiprocessor ATM exchange according to an embodiment of this invention.

FIG. 1 is a block diagram showing the construction of the control system of a multiprocessor ATM exchange according to an embodiment of this invention. In the figure, the control system of a multiprocessor ATM exchange according to an embodiment of this invention comprises common signaling processors 1 and 2 (CSP) (CSP #0 and CSP 1), a call control processor 3 (CLP) (CLP #0), a hub (HUB) 4, and a signal link centralized control section 5 [signal-use AAL (ATM Adaptation Layer) service dependence/common section].

Although not shown in the figure, a plurality of call control processors 3 exist. A processor for managing resources (virtual channels) and the like, in addition to the above mentioned components, are actually included in the control system, but explanation of the constructure and operation of the processor and the like is omitted because they are out of the scope of application of this invention.

The common signaling processors each are associated with specific signal links 100 to 103 (links #0 to #3) via the hub 4. The hub 4 offers functions for communication among the common signaling processors 1 and 2, the call control process 3, and the signal link centralized control section 5. The signal link centralized control section 5 is a firmware for centrally managing the signal links 100 to 103.

The common signaling processors 1 and 2 include signal floating function sections 10 and 20 as subsidiary members of B-ISUP (broadband ISDN user part), signal link control sections 11 and 21, and call control processor state management sections 12 and 22 (hereafter referred to as CLP state management sections).

The call control processor 3 includes an incoming call control section 30, an outgoing call control section 31, B-ISUP protocol bodies 32 and 33 (hereafter referred to as B-ISUP bodies), a signal link control section 34, and a call control processor load monitoring section 35 (hereafter referred to as a CLP load monitoring section). The call control processor 3 includes the signaling identifier (SID) generation function in the B-ISUP bodies 32 and 33. Call control, separated for incoming and outgoing call control, is the same as with most conventional ISDN exchanges, so explanation of call control is omitted. The conventional incoming/outgoing call control separation is detailed in Japanese Patent Publication No. 2-198295.

In a multiprocessor ATM exchange according to an embodiment of this invention, to implement SVC (Switched Virtual Channel) using the B-ISUP protocol in the common channel signaling system; when a call occurs, which of a plurality of call control processors 3 is to be used is determined based on the state monitoring of the call control processors 3 by the floating logic.

The floating logic, on the assumption that a plurality of call control processors are provided to one node (multiprocessor ATM exchange), associates an incoming initial address message with a call control processor by monitoring the state of each of a plurality of call control processors 3.

When common signaling processors 1 and 2 receive an initial address message, they must determine one of the plurality of call control processors 3 to process the call. This determination is based on the state of the call control processors 3, which is held in the CLP state management sections 12 and 22 of the common signaling processors 1 and 2.

The state of call control processors 3 is divided into normal state and abnormal state. In the case of normal state, the load state of call control processors 3 is held in the CLP state management sections 12 and 22 of common signaling processors 1 and 2. The load state of call control processors 3 changes dynamically with notification from the CLP load monitoring section 35 of call control processors 3, and if notification is discontinued for a given period of time; it is regarded as an abnormal state. The common signaling processors 1 and 2 associate an initial address message with a call control processor 3 which is in normal state and least loaded.

The logic of generating a signaling identifier, a parameter required for B-ISUP protocol signals, is included in the B-ISUP bodies 32 and 33 of call control processors 3. The logic of generating a signaling identifier is a generation source of a signaling identifier and dictates how a signaling identifier is generated.

To generate a signaling identifier unique in a node, the B-ISUP bodies 32 and 33 organize a maximum of 32 bits of a signaling identifier by performing the logical computation OR of a call identifier having a unique value within call control processors 3 and the serial number (clp number) of a call control processor 3 having a unique value within the node so that both do not overlap within the 32 bits.

The floating logic of associating a B-ISUP protocol signal with the call control processor 3 after determination of the call control processor 3 dictates a method for associating call control signals other the initial address message with the call control processor 3. In this case, the floating logic, when a plurality of call control processors are provided to one node, after the initial address message has been associated with the call control processor 3, associates following call control signals with the call control processor 3. The common signaling processors 1 and 2 to receive a call control signal, if the signal is not the initial address message, extracts the clp number of the call control processor 3 associated at reception of the initial address message to perform floating, from a signaling identifier generated within an own node and returned after being handshaked among adjacent nodes.

Figure 2:
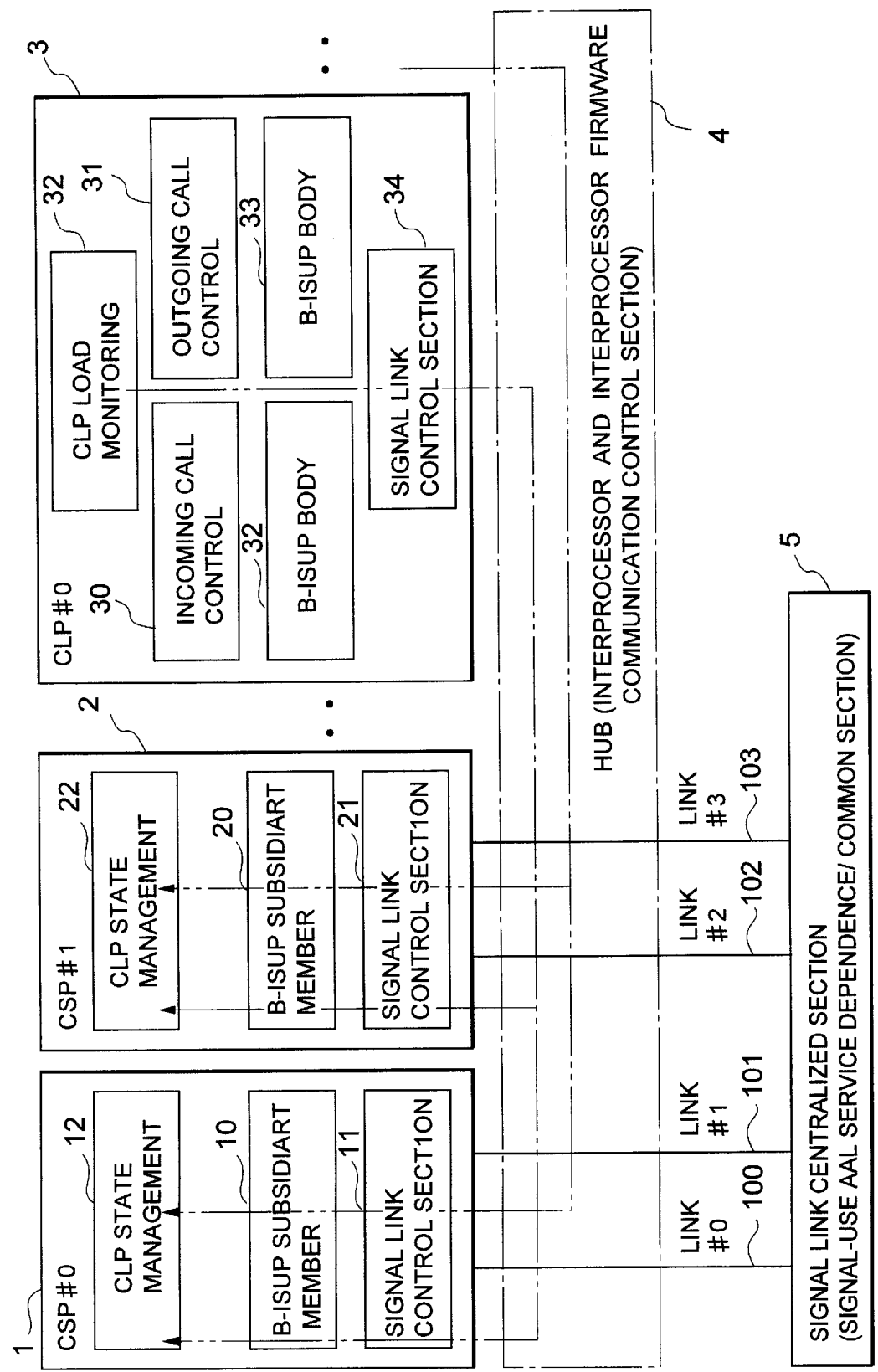
FIG. 2 is a diagram showing CLP state management on which floating processing for an initial address message according to an embodiment of this invention is based.
Figure 3:
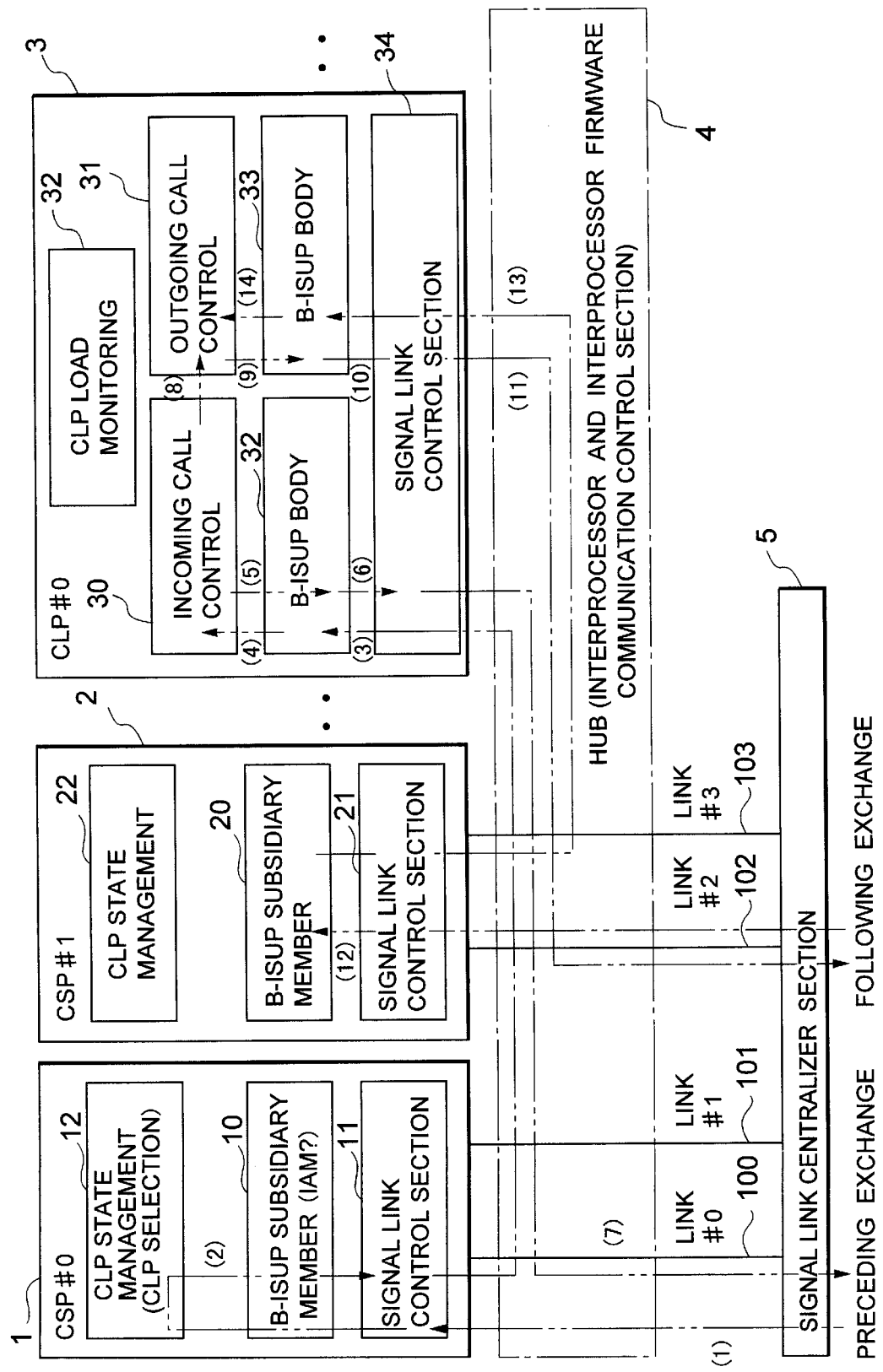
FIG. 3 is a diagram showing floating processing for call controlling signals according to an embodiment of this invention.

FIG. 2 is a diagram showing CLP state management on which floating processing for the initial address message according to an embodiment of this invention is based. FIG. 3 is a diagram showing call control signal floating processing according to an embodiment of this invention. Floating of a call control signal including an initial address message according to an embodiment of this invention will now be described with reference to FIGS. 1 to 3.

In each call control processor 3, the CLP load monitoring section 35 monitors the load state of an own processor, that is, the use ratio of CPU (central processing unit) not shown in the figure. The CLP load monitoring section 35 periodically transmits monitoring result (e.g., once every 30 seconds) as load state notification to the CLP state management sections 12 and 22 of all common signaling processors 1 and 2 via the hub 4. The CLP load monitoring section 35, when a local processor fails, stops reporting its load state.

The CLP state management sections 12 and 22 of the common signaling processors 1 and 2 collect load state information from the CLP load monitoring section 35 to manage the load state of call control processor 3, and determine that the call control processor 3 is defective, if load state information is discontinued from the call control processor 3.

If the signal floating function section 10 receives an initial address message from the signal link 100, the signal floating function section 10 selects a call control processor (call control processor 3 (CLP #3) in this case) most suitable for processing said call from the CLP state management section 12 and transfers the initial address message to the B-ISUP body 32 via the hub 4 (see (1), (2), and (3) in FIG. 3).

On receiving the initial address message, the B-ISUP body 32 reports the fact to the incoming call control section 30 and generates an origination signaling identifier from the incoming internal call reference number and the clp number of the call control processor 3 (see (4) in FIG. 3). On receiving a response from the incoming call control section 30, the B-ISUP body 32 sends to the signal link control section 34 an IAM acknowledgement (IAA) message with the outgoing signaling identifier appended (see (5) and (6) in FIG. 3).

The signal link control section 34 selects a signal link (link #0 in this case) and sends the IAM acknowledgement message to a preceding exchange (exchange that relayed the initial address message) (not shown) via the hub 4 (see (7) in FIG. 3).

Here, the signal link control section 34 gets a call transfer destination and a signal link selection number from a higher level user (not shown). In this case, the transfer destination of the IAM acknowledgement message sent from the incoming call control section 30 is a direction of a preceding exchange and a signal link in the route defined In an office data is selected. For example, when signal links 100 and 101 are defined in the exchange data, either of the signal links 100 and 101 is selected according to a signal link selection number from the higher level user and the state of the signal links 100 and 101.

The transfer destination of the initial address message sent from the outgoing call control section 31 is assumed to be in a direction of the succeeding exchange (exchange to relay an initial address message received by a local exchange to) (not shown). When signal links 102 and 103 are defined in the office data as signal links to the succeeding exchange, to send the initial address message, either of the signal links 102 and 103 is selected according to a signal link selection number from the higher level user and the state of signal links 102 and 103.

Since there is no association between the assigned virtual channel and the outgoing call control section 31, the routing process fixedly selects call control (the outgoing call control section 31 in this case) within identical call control processor 3 (see (8) in FIG. 3), and sends initial address message information containing an outgoing internal call reference number to the B-ISUP body 33 via the outgoing call control section 31 (see (9) in FIG. 3).

The B-ISUP body 33 generates an origination signaling identifier from an outgoing internal call reference number and the clp number of call control processor 3 and sends the initial address message with the origination signaling identifier appended to the signal link control section 34 (see (10) in FIG. 3). The signal link control section 34 selects signal link (link #2 in this case) and sends the origination initial address message containing the origination signaling identifier to the succeeding exchange via the hub 4 (see (11) in FIG. 3).

When the common signaling processor 2 receives an IAM acknowledgement message in response to said initial address message from the succeeding exchange in the signal floating function section 20 via the signal link 102 (see (12) in FIG. 3), since the signal is not an initial address message, the signal floating function section 20 extracts the clp number of call control processor (clp number (CLP #0) of call control processor 3 in this case) from a destination signal identifier handshaked among succeeding exchanges.

The signal floating function section 20 floats the IAN acknowledgment message to the B-ISUP body 33 based on the clp number of call control processor extracted from the destination signal identifier (see (13) in FIG. 3).

When the IAM acknowledgment message has been floated from the signal floating function section 20, the B-ISUP body 33 sends the IAM acknowledgment message to the outgoing call control section 31 (see (14) in FIG. 3). As a result, said call signal is successfully associated in the outgoing call control section 31 based on the outgoing internal call reference number.

Subsequently, all signals to control said call, after being received in the common signaling processor 1 or 2, are associated with the call control processor 3 in the same way as described above, so that dynamic floating of call control signals by a multiprocessor ATM exchange is implemented.

Figure 4:
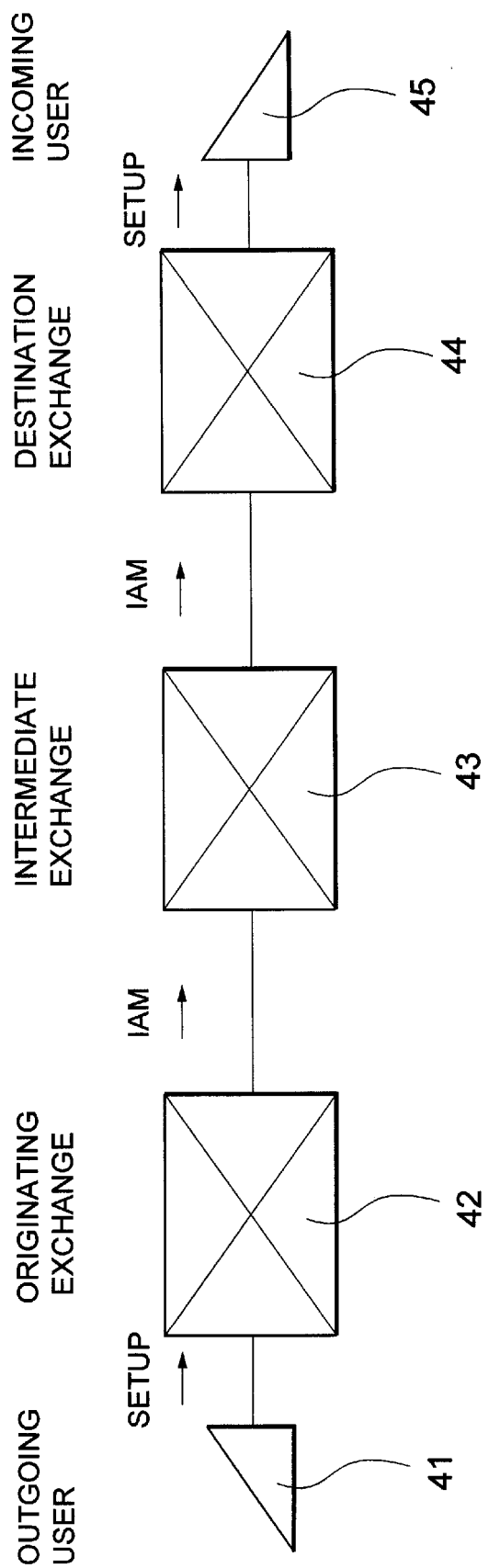
FIG. 4 is a diagram showing the construction of an exchange system using a multiprocessor ATM exchange according to an embodiment of this invention.

FIG. 4 is a diagram showing the constructure of an exchange system using a multiprocessor ATM exchange according to an embodiment of this invention. In the figure, an exchange 43 has the same constructure as that of a multiprocessor ATM exchange described above.

When an user 41 (an outgoing user 41) originates a call to an user 45 (an incoming user 45), a signal (setup) is sent from the outgoing user 41 to an outgoing exchange 42. A signal (IAM) is sent to the destination exchange 44 via a exchange 43. The signal (setup) is sent from the destination exchange 44 to the incoming user 45. In this process, the exchanges 43 float call control signals including an initial address message described above. In this case, the originating exchange 42 serves as a preceding exchange with respect to the intermediate exchange 43 and the destination exchange 44 serves as a succeeding exchange with respect to the intermediate exchange 43.

Figure 5:
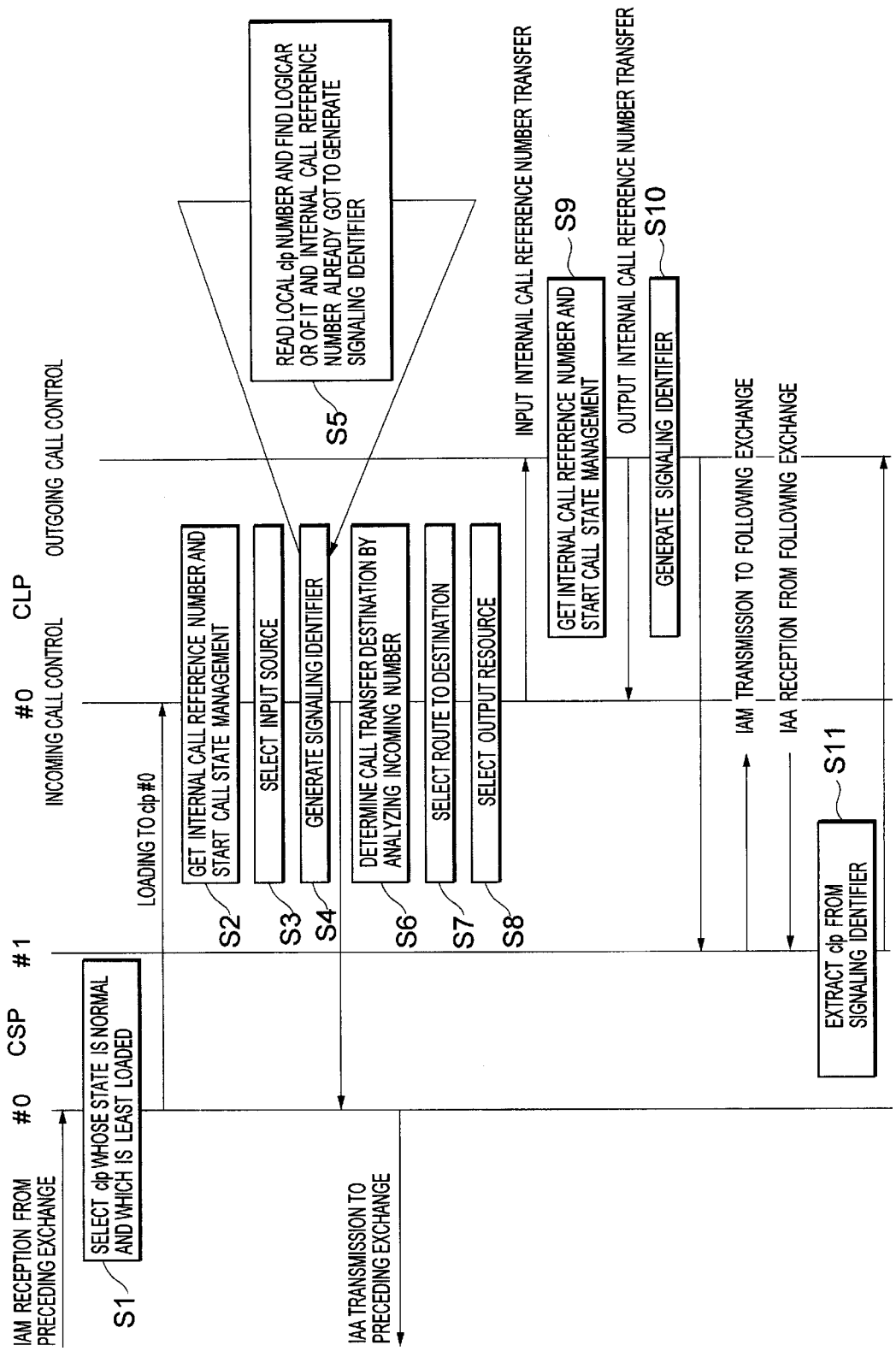
FIG. 5 is a flowchart showing the floating processing for call control signals including an initial address message according to an embodiment of this invention.
Figure 6:
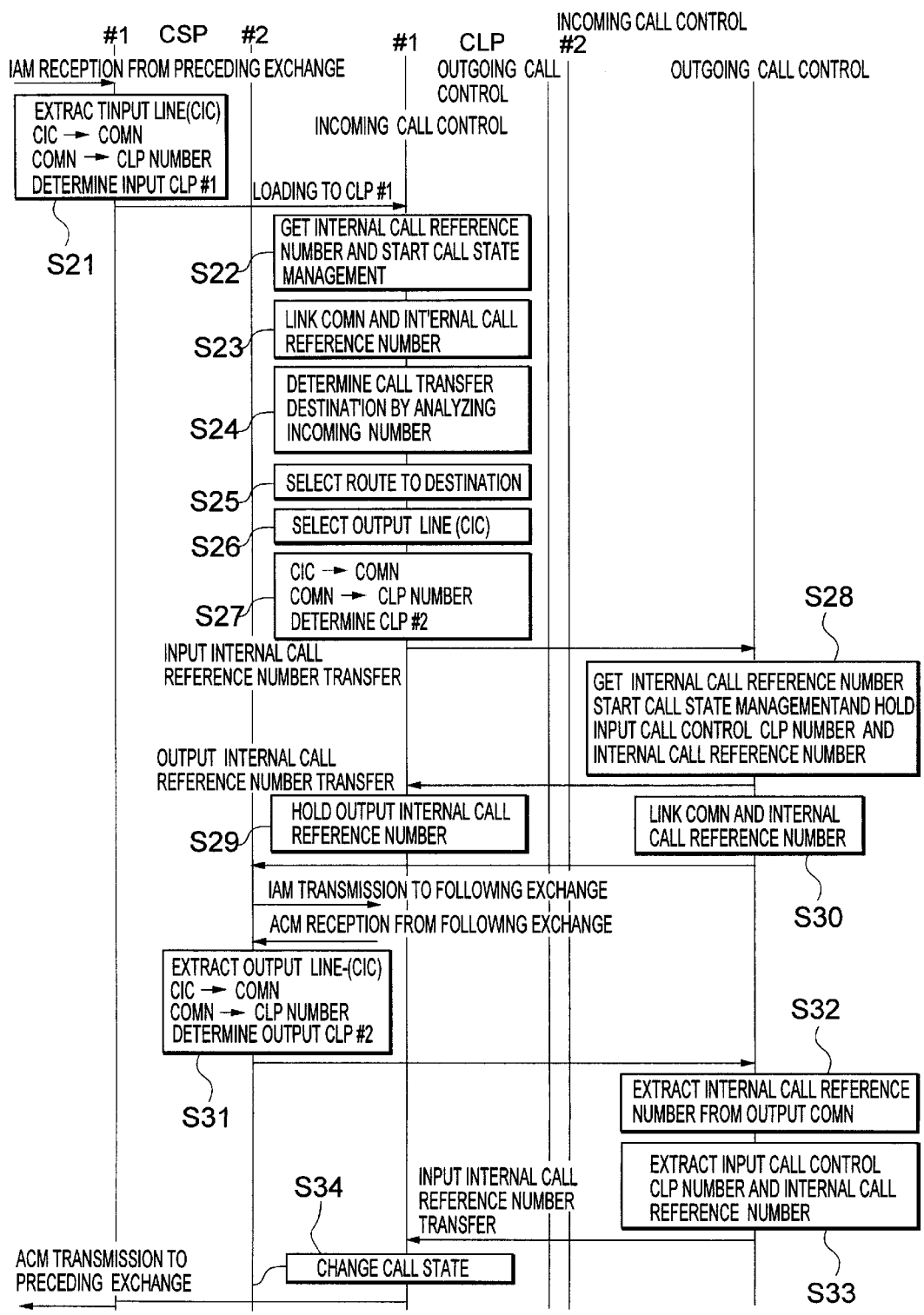
FIG. 6 is a flowchart showing the floating processing for call control signals including an initial address message according to a conventional example.

FIG. 5 is a flowchart showing the floating processing for call control signals including an initial address message according to an embodiment of this invention. The floating processing for call control signals including an initial address message according to an embodiment of this invention will now be described with reference to FIGS. 1 and 5. In FIG. 5, B-ISUP protocol processing is included in input call control and output call control.

On receiving an initial address message (IAM) from a preceding exchange, the signal floating function section 10 of the common signaling processor 1 (CSP #0) determines a call control processor most suitable for processing said call based on the state monitoring contents of call control processor 3 by the CLP state management section 12, that is, a call control processor (e.g., CLP #0) that is in normal state and least loaded (step S1 in FIG. 5).

Accordingly, the common signaling processor 1 performs floating to the incoming call control section 30 of the call control processor 3 of clp number (CLP #0) determined from the above initial address message. The call control processor 3 of the clp number (CLP #0) acquires the internal call reference number and starts call state management (step S2 in FIG. 5).

The call control processor 3 of the clp number (CLP #0) selects an incoming resource (step S3 in FIG. 5) and generates (step S4 in FIG. 5) a signaling identifier to be appended to an IAM acknowledgement (IAA) message corresponding to the initial address message. The signaling identifier is generated in such a way as to get the clp number (CLP #0) of own processor and perform the logical computation OR of the clp number (CLP #0) and the internal call reference number already got (step S5 in FIG. 5). The call control processor 3 of the clp number (CLP #0) sends an IAA acknowledgement message with the signaling identifier appended to the common signaling processor (CSP #0) 1. On receiving it, the common signaling processor (CSP #0) 1 sends the IAM acknowledgement message to the preceding exchange.

Hereafter, the call control processor 3 of the clp number (CLP #0) determines a call transfer destination by analyzing the digits of the called party number (step S6 in FIG. 5), selects a route to the destination (step S7 in FIG. 5), then selects an outgoing resource (step S8 in FIG. 5). However, in the case of an ATM exchange, since one side selection of resources is performed, resources are not always selected at this point (steps S3 and S5).

The call control processor 3 of the clp number (CLP #0) transfers the incoming internal call reference number to the outgoing call control. The call control processor 3 of the clp number (CLP #0) gets the internal call reference number and starts managing call state (step S9 in FIG. 5). At this time, the call control processor 3 of the clp number (CLP #0) transfers the outgoing internal call reference number to the incoming call control.

Subsequently, the call control processor 3 of the clp number (CLP #0) generates a signaling identifier to be appended to the initial address message (step S10 in FIG. 5). In the same way as described above, the signaling identifier is generated in such a way as to get the clp number (CLP #0) of own processor and perform the logical computation OR of the clp number (CLP #0) and the internal call reference number already got. The call control processor 3 of the clp number (CLP #0) sends an initial address message with the signaling identifier appended to the common signaling processor (CSP #1) 2. On receiving it, the common signaling processor (CSP #1) 2 sends the initial address message to a succeeding exchange.

On receiving an IAM acknowledgement message sent from the succeeding exchange in response to the sent initial address message, the common signaling processor (CSP #1) 2 extracts a clp number from the signaling identifier of the IAM acknowledgement message (step S11 in FIG. 5), floats the IAM acknowledgement message based on the clp number, and sends the IAM acknowledgement message to the call control processor 3 of the clp number (CLP #0).

The above explanation has been made for the case where a plurality of common signaling processors 1 and 2 and a plurality of call control processors 3 exist within one node, but this invention is also applicable to the case where one common signaling processor and a plurality of call control processors 3 exist within one node.

Thus, the CLP state management sections 12 and 22 of the common signaling processors 1 and 2 monitor the state of call control processors 3. The signal floating function section 10 selects an optimum floating destination (call control processor) of an initial address message according to the monitoring. The call control processor 3 generates the signaling identifier including the clp number by the signaling identifier generation logic. Therefore, since the signaling identifier is handshaked among opposite exchanges regardless of by which of the common signaling processors 1 and 2 are received following B-ISUP signals, floating to said call control processor 3 is made possible by the common signaling processors 1 and 2, and signal floating can thus be implemented. Implementation of the signal floating permits an ATM exchange to be constructed with multiple processors.

Implementation of SVC requires memory for managing call state, but only a limited amount of memory can be controlled by one processor, creating a bottleneck in the number of concurrent connections. Therefore, since addition of processors increases a total control memory amount in a node, a controllable number of concurrent connections increases and the number of concurrent connections to SVC increases, so that the exchange can be provided with high capacity.

According to a multiprocessor ATM exchange of this invention described above, the multiprocessor ATM exchange is configured so that an initial address message received in a common signaling processor is processed by one of a plurality of call control processors provided to an identical node, wherein the load state of an own processor is reported to the common signaling processor from each of the plurality of call control processors, the load state and normal/abnormal state of each of the plurality of call control processors are managed based on the report by the common signaling processor, and the initial address message is transferred from the common signaling processor to one of the plurality of call control processors selected based on the management contents at reception of the initial address message, whereby an ATM exchange can be constructed with multiple processors to provide high capacity.

According to another multiprocessor ATM exchange of this invention described above, floating is performed by generating a signaling identifier including a response signal for an initial address message and a processor number for identifying own processor and extracting a processor number from the signaling identifier of the local node, whereby an ATM exchange can be constructed with multiple processors to provide high capacity.

What is claimed is:

1. A multiprocessor ATM exchange constructed so that an initial address message received in a common signaling processor is processed by one of a plurality of call control processors allocated to an identical node, wherein said common signaling processor includes transfer means for transferring said initial address message from a preceding exchange to one of said plurality of call control processors, and wherein each of said plurality of call control processors include:

incoming call control means for receiving an initial address message and generating an origination signaling identifier from a unique call reference number within the call control processor and a call processor number and sending an acknowledgement message with said origination signaling identifier to said preceding exchange; and outgoing call control means for generating an origination signaling identifier from an outgoing internal reference call number and the call control processor number and sending said initial address message with said origination signaling identifier to a succeeding exchange, and said common signaling processor further includes means for extracting the call control processor number from received destination signal identifier and transferring said initial address message to the call control processor based on an extracted call control processor number.

2. A multiprocessor ATM exchange according to claim 1, wherein each of said plurality of call control processors further Includes notification means for reporting a load state of own processor to said common signaling processor, and wherein said common signaling processor includes state management means for managing said load state and normal/abnormal state of each of said plurality of call control processors based on notification from said notification means, and said transfer means selects said call control processor based on management contents of said state management means at reception of said initial address message.

3. A multiprocessor ATM exchange according to claim 2, wherein a call control processor that is determined to be in normal state by said state management means and least loaded is selected to process said initial address message, and said initial address message is transferred to the selected call control processor.

4. A multiprocessor ATM exchange according to claim 1, wherein said outgoing call control means generates a signaling identifier unique in said node by performing a logical computation OR of a call identifier having a unique value in own processor and the serial number of own processor having a unique value within said identical node so that they do not overlap.

5. A multiprocessor ATM exchange according to claim 2, wherein said outgoing call control means generates a signaling identifier unique in said node by performing a logical computation OR of a call identifier having a unique value in own processor and the serial number of own processor having a unique value within said node so that they do not overlap.

6. A multiprocessor ATM exchange according to claim 3, wherein said outgoing call control means generates a signaling identifier unique in said node by performing a logical computation OR of a call identifier having a unique value in own processor and the serial number of own processor having a unique value within said node so that they do not overlap.

* * * * *